(No Model.)
J. W. FOSTER.
SPOOLING MACHINE.
No. 473,417. Patented Apr. 19, 1892.
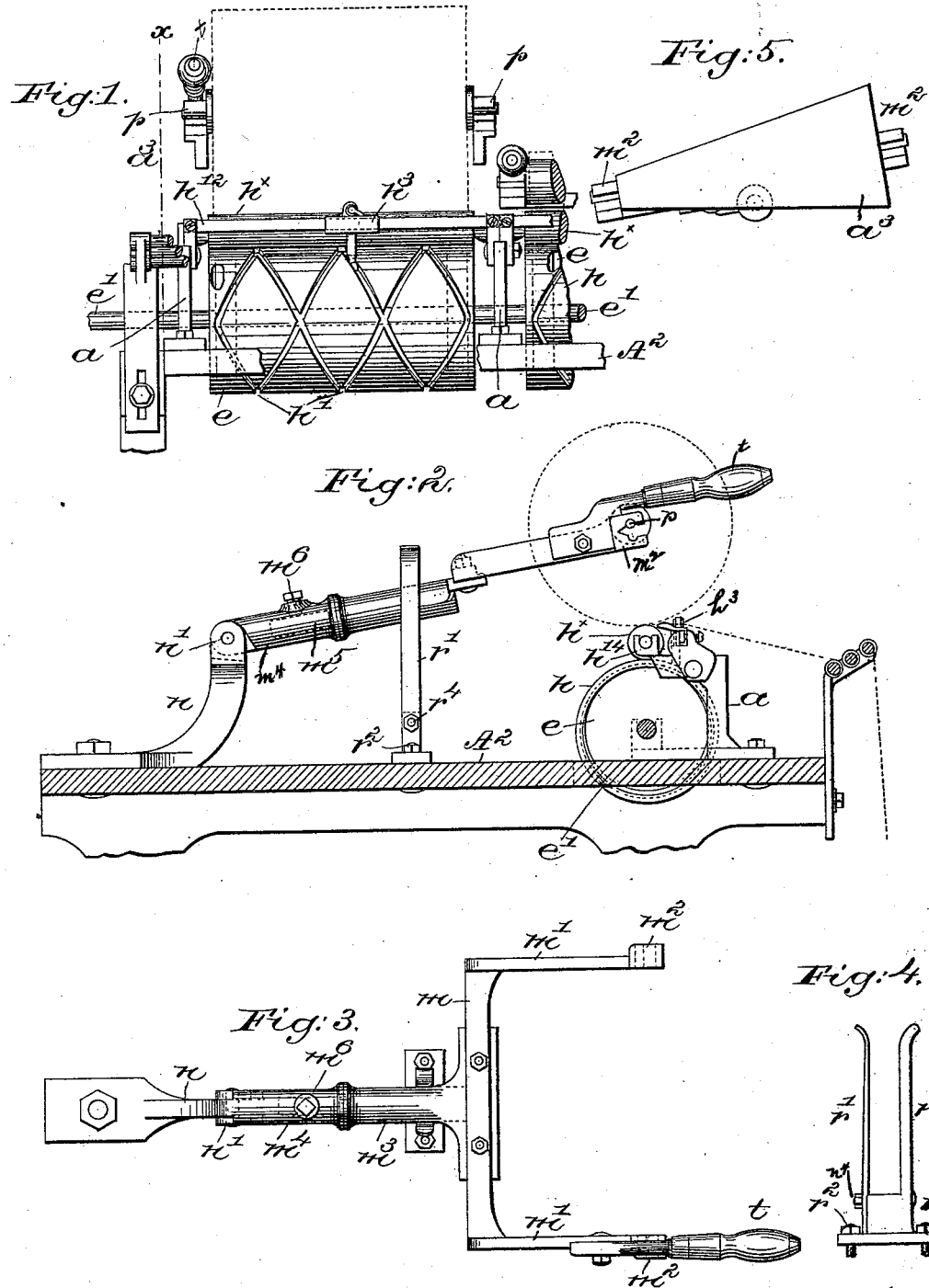
Witnesses,
Edward F. Allen.
Emma L. Bennett.
Inventor,
John W. Foster,
by Crosby & Gregory
attys.

UNITED STATES PATENT OFFICE.

JOHN W. FOSTER, OF WESTFIELD, MASSACHUSETTS, ASSIGNOR TO THE FOSTER MACHINE COMPANY, OF SAME PLACE.

SPOOLING-MACHINE.

SPECIFICATION forming part of Letters Patent No. 473,417, dated April 19, 1892.

Application filed January 20, 1892. Serial No. 418,675. (No model.)

*To all whom it may concern:*

Be it known that I, JOHN W. FOSTER, of Westfield, county of Hampden, State of Massachusetts, have invented an Improvement in Spooling-Machines, of which the following description, in connection with the accompanying drawings, is a specification, like letters on the drawings representing like parts.

United States Patents Nos. 459,039 and 459,040, granted to me September 8, 1891, show and describe apparatus for winding masses of thread or yarn, the first upon a quill and the latter upon a cone, the journals of the roll holding the quill and also of the roll holding the cone having co-operating with them a vertically-sliding weighted yoke. In the said patents the series of shell-rolls, one for each spool or cone upon which the yarn or filamentous material was wound, were arranged side by side and parallel each to the other; but herein I have provided to arrange the shell-rolls end to end, or substantially so. In my efforts to better adapt spooling-machinery, preferably such as represented in said patents, to holding and controlling the journals carrying the quill or a cone upon which the yarn is being wound, so that the mass of yarn shall be kept down properly upon the winding-roll or device interposed between the quill or cone on the one side and the shell-roll on the other side, I have provided a yoke of peculiar construction, said yoke being so made as to support and carry the said journals so that by lifting the yoke the journals will be lifted and the spool or cone be elevated out of contact with relation to the driving-roll of whatever form, such as provided for in said patents. This yoke, in order that it may be readily elevated, is provided with a handle, and with the yoke I have combined a friction device to prevent the too-free rising of the yoke during the winding operation. The friction device, for the best results, will have one arm or part adjustable with relation to the other arm or part, and preferably one part will be made as a spring, so as to regulate the friction. The yoke referred to is mounted upon a pivot, which is parallel, or substantially so, to the axis of rotation of the driving-roll referred to, so that the free end of the yoke having the bearings to support the journals used to sustain either the quill or the cone may rise and fall, and also the said yoke will have a suitable swivel-joint between the bearings and the pivot referred to, so that the part of the yoke containing the bearings referred to may tip about a pivot or center substantially at right angles to the center of rotation of the driving-roll, adjustment of the portion of the yoke containing the bearings as last referred to enabling either a quill or a cone to be readily supported by the yoke and yet be presented properly with relation to the driving-roll.

My invention consists in the combination, in a spooling-machine, with a yoke provided with bearings adapted to not only rise and fall about a horizontal pivot parallel with the axis of rotation of the driving-roll, but also to rock or tip at right angles to the axis of rotation of the said driving-roll, of an adjustable friction device co-operating with said yoke, and means to adjust said device to vary the friction, to operate substantially as will be described.

Figure 1 in front elevation represents a sufficient portion of a spooling-machine containing my improvements to enable my present invention to be understood. Fig. 2 is a view taken to the right of the dotted line $x$, Fig. 1. Fig. 3 is a top or plan view of the yoke alone; Fig. 4, a front elevation of the friction device and yoke-guide; Fig. 5, a front end view of the yoke shown as supporting a cone instead of a quill or spool or bobbin.

Referring to the drawings, let it be supposed that the shaft $e'$ is extended from end to end of a spooling-machine, and that it has on it a series of sets of disks $e$, which receive over them loosely a series of hollow shell-rolls $h$, the latter hanging by their weight upon the disks, and in such condition being rotated thereby, the shell-rolls having suitable crossing or endless grooves $h'$ to receive a stud or pin projecting from a traverse-guide $h^3$, provided with an eye to receive the thread or filamentous material which is to be wound, the said shell-roll acting to reciprocate the said traverse-guide upon suitable guide-rods $h^{12}$, held at their ends in suitable stands $a$, erected on a top plate or table $A^2$. Resting upon the shell-roll is a driving-roll $h^\times$, having its journals laid loosely in a bearing $h^{14}$, supported by the stands $a$.

The parts so far described and referred to by letter are substantially the same as in the patents cited as to their operation, and in practice the shaft $e'$ may be rotated in any usual or suitable manner adapted to spooling-machines, and the shell-roll will have working with it a brake-shoe or lifting device, substantially as provided for in the said patents, but not herein shown, which when the mass of yarn is of proper diameter or the thread breaks will cause the shell-roll to be lifted from contact with the disks, thus immediately stopping the rotation of the shell-roll and the winding operation.

As to the driving-roll (designated by the letter $h^\times$) it, when a quill is to be wound so as to make a cylindrical mass of thread or filamentous material, will preferably be cylindrical in form, and the periphery of the said driving-roll for that work may be in one single piece; but when a cone or conical mass of thread or filamentous material is to be wound then the driving-roll will be of the form provided for in United States Patent No. 459,040, wherein the driving-roll is shown and described as made up of a series of loose rolls or sections, so as to avoid undue friction upon the yarn mass, which varies in diameter and consequent surface speed from end to end.

I will now describe my improved yoke. Erected upon the table $A^2$ is a stand $n$, which supports a pivot $n'$, which is located parallel, or substantially so, to the axis of rotation of the driving-roll $h^\times$. The yoke referred to as one of the chief features of this present invention is composed of a part $m$, having arms $m'$ $m'$, provided with suitable bearings $m^2$, the part $m$ having a rearwardly-extending portion $m^3$, which is pivoted, jointed, or articulated with relation to the part $m^4$ of the yoke, so that the part $m$ may tip or turn on or with relation to the part $m^4$ about a pivot substantially at right angles to the center of rotation of the driving-roll. In this present instance of my invention the articulation referred to has been effected by a projection $m^5$ (shown by dotted lines) of the part $m^3$ entering a hole or longitudinal central opening in the part $m^4$, a screw $m^6$ co-operating with the extension or pivot $m^5$, retaining the portion $m$, having the bearings $m^2$, in proper position with relation to the part $m^4$ of the yoke, which is free to rise vertically about the horizontal pivot $n'$ referred to. When a quill is to be wound with a cylindrical mass of thread, either a paper or other quill of any usual or suitable form is provided in the usual manner with journals $p$, which are mounted in the bearings $m^2$, and the part $m$ of the yoke is so adjusted with relation to the part $m^4$ that the center of rotation of the quill and its journals $p$ will be substantially parallel to the center of rotation not only of the driving-roll $h^\times$, but also of the shaft $e'$; but when a cone or a conical mass of thread or filamentous material is to be wound, then a cone, substantially such as provided for in said Patent No. 459,040, or as shown in Fig. 5, will have its journals mounted in the bearing $m^2$ of the yoke, and the screw $m^6$ will be loosened, so as to let the portion $m$ of the yoke be tipped about a pivotal point or center substantially at right angles to the center of rotation of the driving-roll, so that the cone can take proper bearing upon the driving-roll of whatever form, preferably such a driving-roll as provided for in Patent No. 459,040.

In practice the portion $m^3$ of the yoke is placed between the jaws $r$ $r'$ of a friction device suitably attached to the table-plate $A^2$ by suitable screws $r^2$, one of the arms $r'$ being preferably of spring metal and being adjustably attached to the block or stand, to which is connected the arm $r$, so that by or through a suitable nut or screw $r^4$ the arm $r'$ may be adjusted toward or from the arm $r$. This friction device, by pinching the portion $m^3$ of the yoke, acts as and performs the duty of the weight provided for in the last-mentioned patent, and also obviates jarring due to the rapid motion of some of the parts, and the friction of the friction device upon the yoke has to be overcome as the mass of thread is being wound and the yoke rises. By the adjusting means the friction can be varied, as desired. I have provided the yoke with a handle $t$, which may be engaged by hand whenever it is desired to quickly lift the bearing end of the yoke to elevate the mass of wound thread or filamentous material from the driving-roll or for any other purpose in the operation of the parts.

Having described my invention, what I desire to claim and secure by Letters Patent is—

1. The combination, with a driving-roll to act on and rotate a quill or cone upon which is to be wound filamentous strands, of a yoke having a pivot substantially parallel with the center of rotation of the driving-roll and also a pivot substantially at right angles to the center of rotation of the driving-roll, an adjustable friction device co-operating with said yoke, and means to adjust said device to vary the friction, substantially as described.

2. In a spooling-machine, the combination, with a yoke provided with bearings adapted to rise and fall about a horizontal pivot parallel with the axis of rotation of the driving-roll and also to rock or tip at right angles to the axis of rotation of the said driving-roll, of an adjustable friction device co-operating with said yoke, said device comprising a fixed and a movable friction-jaw between which the yoke is held, and means to move the jaws toward or from each other to operate substantially as described.

In testimony whereof I have signed my name to this specification in the presence of two subscribing witnesses.

JOHN W. FOSTER.

Witnesses:
 ALFRED F. LILLEY,
 JAMES NOBLE, Jr.